March 8, 1938. K. P. SYNNESTVEDT 2,110,638
AIRCRAFT WITH AUTOROTATABLE SUSTAINING ROTORS
Filed Aug. 8, 1936 2 Sheets-Sheet 1
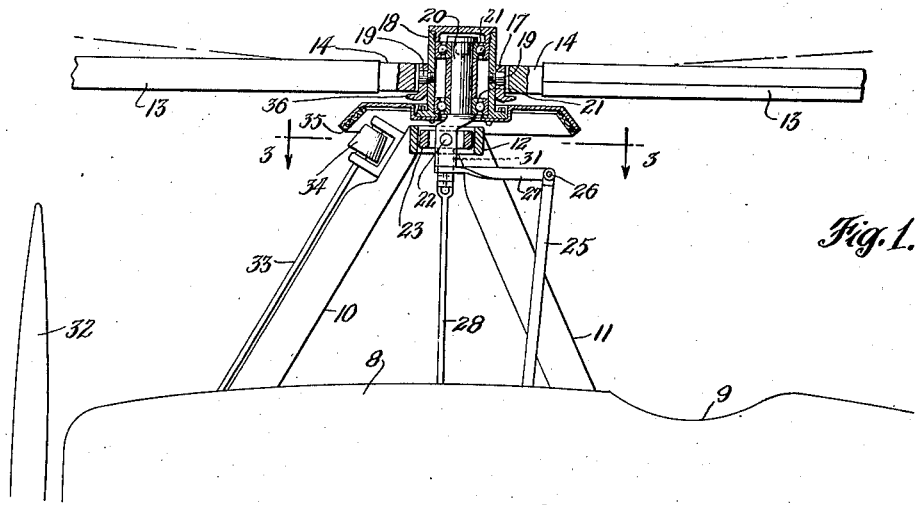
Fig. 1.
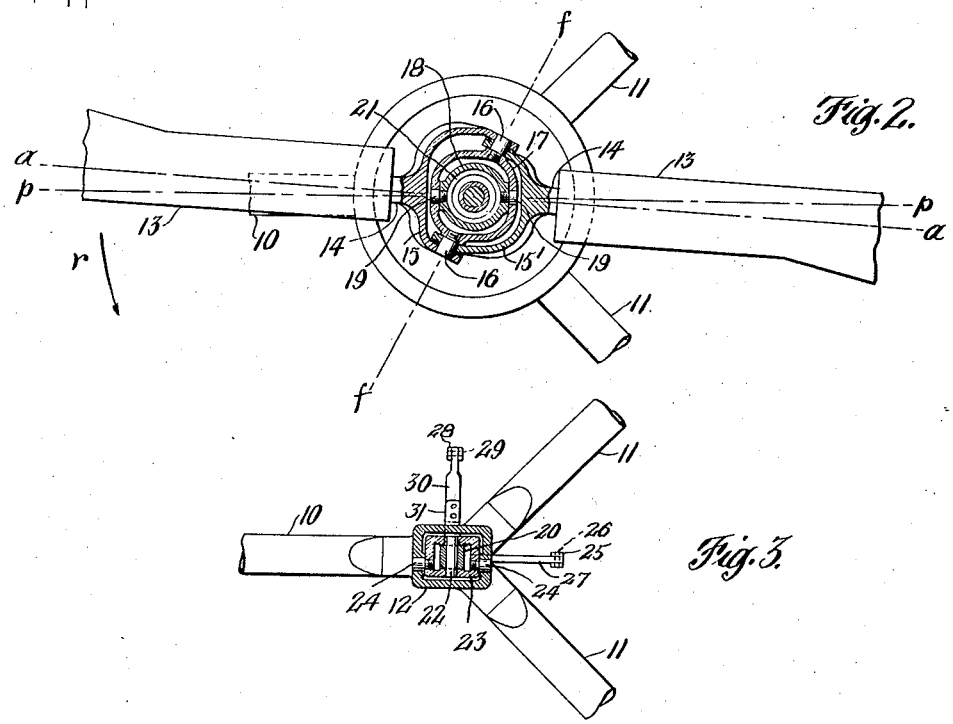
Fig. 2.
Fig. 3.
INVENTOR
Kenneth P. Synnestvedt
BY
Synnestvedt & Lechner
ATTORNEYS March 8, 1938.　　K. P. SYNNESTVEDT　　2,110,638
AIRCRAFT WITH AUTOROTATABLE SUSTAINING ROTORS
Filed Aug. 8, 1936　　2 Sheets-Sheet 2

INVENTOR
Kenneth P. Synnestvedt
BY
Synnestvedt + Lechner
ATTORNEYS

Patented Mar. 8, 1938

2,110,638

UNITED STATES PATENT OFFICE 2,110,638

AIRCRAFT WITH AUTOROTATABLE SUSTAINING ROTORS

Kenneth P. Synnestvedt, Bryn Athyn, Pa., assignor to Autogiro Company of America, Willow Grove, Pa., a corporation of Delaware Application August 8, 1936, Serial No. 94,882

16 Claims. (Cl. 244—18)

This invention relates to aircraft with autorotatable sustaining rotors, and particularly to rotor constructions of the type wherein the rotative blades or wings have free and automatic movements under the influence of flight forces particularly in a direction generally transverse their rotative path of travel, and while not limited thereto the invention is especially useful in aircraft wherein the rotor constitutes the primary means of control as well as of sustention for the craft.

Among the primary objects of the invention are: the reduction of the flapping movement of the rotor blades on their individual pivots, the minimization of abnormal variations in position of the average lift line of the rotor, the reduction of undesirable loads and gyroscopic effects on the control system for the rotor, the smoothing out or accommodation of air bumps and other disturbances, and in general the improvement of the operation of the rotor as a whole.

The invention further contemplates making possible the lowering of the rotor center to a position closer to the body of the craft, thus lowering the center of gravity of the machine, and particularly in machines where the rotor is tiltably mounted for control purposes, without reducing necessary clearances over such parts as the propeller and tail, or alternatively increasing the possible range of angular tilt of the rotor for control purposes, by reducing the extent of flapping of the rotor blades, while still maintaining full freedom for the blades to accommodate themselves to the differential pressure conditions which arise at opposite sides of the rotor especially during high speed forward flight.

Still further, the invention contemplates the improvement and simplification of the rotor hub and blade pivot mechanism, whereby the plane of such mechanism can be brought quite close to the plane of the rotor tilting fulcrums. The invention, in addition, by smoothing out the operation of the rotor renders more feasible the use of two-bladed rotors, with resultant further simplification and reduction of manufacturing costs and maintenance.

More specifically, the invention contemplates a rotor head structure in which the individual blades, which are preferably disposed in diametrical opposition, are independently pivoted upon a common mounting member which is in turn movably mounted on the hub for rocking of the blades as a unit, and the universal mounting of said hub for control purposes by means of pivot mechanism such as a longitudinal and a transverse pivot located in a plane close to the plane of the pivots first mentioned. Preferably according to the invention the individual pivots for the blades are on axes which, when viewed in plan, are close to or only slightly inclined from a perpendicular to the longitudinal blade axes, and the pivot for rockingly securing the common blade mounting member to the hub is upon an axis coinciding or slightly inclined with respect to the longitudinal blade axes, with the major area of each blade lying behind the axis line of said pivot with respect to the direction of rotation.

The invention also contemplates, in one of its embodiments, the individual articulation of the several blades upon axes intersecting the rotor axis and at oblique angles to the longitudinal blade axes, as by means of pivots mounted in a ring member which latter surrounds the hub and is in turn pivoted thereto on an axis intersecting the axis of the hub and at an angle intermediate the longitudinal blade axes and the individual pivot axes for a pair of opposed blades; the location of said individual and common pivot means in the same plane as the blades; the location of the non-rotative hub support and bearing centrally within the hub; and the universal tilting mounting of the non-rotative axis member in a plane below the blade pivot mechanism.

The invention alternatively involves the individual articulation of opposite blades by pivot pins offset from the axis of the hub lying respectively in the plane of the attached blade and substantially at right angles to the longitudinal axis thereof, and the securing of said pins in opposite ends of a through-shaft, the axis of which intersects the hub axis and substantially coincides with the longitudinal blade axes, viewed in plan, said shaft being mounted in bearings at the top of the hub above the hub bearings and hub tilting fulcrums.

Still further, the invention contemplates, in another embodiment, a rectangular relationship between the individual blade pivot axes and the longitudinal blade axes, and an obliquity between the common pivot axis and the longitudinal blade axes; the separation of the planes of the individual blade pivots and the common pivotmounting for opposite blades, and preferably the interposition of said common pivot in a plane located between the plane of the blade pivots and the plane of the rotor tilting fulcrums, whereby the common blade mounting member tends to assume a stable position on its pivot by virtue of the combined action of the individual blades and of the vertical offset through which the total lift of the rotor is acting with respect to the pivotal mounting of said common member.

How the foregoing objects and advantages, together with such others as may be incident to the invention, are obtained will be evident from the following description, taken together with the accompanying drawings, in which:

Figure 1 is a fragmentary side elevational view of an aircraft sustaining and controlling rotor and its mounting upon the craft, illustrative of one embodiment of the present invention, the rotor head being shown in vertical section;

Figure 2 is a top plan view of the structure of Figure 1, with the rotor head shown in horizontal section at the plane of attachment of the rotor blades;

Figure 3 is a section taken about on the line 3—3 of Figure 1, with the rotor starter mechanism omitted.

Figure 4:
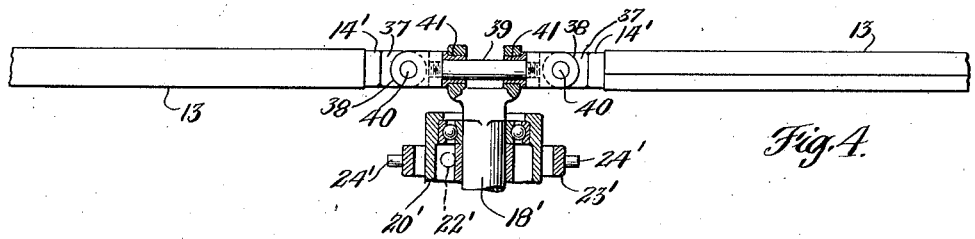
Figure 4 is a fragmentary view similar to Figure 1 but illustrating a second embodiment of the invention.

By reference first to Figures 1 to 3, it will be seen that I have fragmentarily illustrated the upper portion of the aircraft body 8, having a pilot's cockpit 9, forward of which is a rotor mounting pylon comprising a front leg 10 and two rear legs 11. The pylon legs converge sharply to an apex member formed as a square frame 12, positioned closer to the body than is the usual apex member, as the rotor of the present invention requires less average clearance over the body because the blades or wings thereof have a smaller range of flapping during flight.

The rotor comprises a plurality of blades, in this case a pair of blades 13, at the root ends of which the spars 14 are forked respectively at 15, 15′, in interleaving relation, for independent pivoting of the blades upon the pivot pins 16 which are secured in a common rocking member formed as a ring 17 located in external peripheral relationship to the tubular hub 18 and pivoted thereon by pivot pins 19 the axis $p$—$p$ of which is intermediate the axis $f$—$f$ of the blade pivots 16 and the longitudinal axis $a$—$a$ of the blades. It will be observed that the contour of the forked ends of the blade spars is such that the flapping axis $f$—$f$ of the individual blade articulation pivots 16 forms a slight angle (viewed in plan) with respect to the perpendicular drawn to the longitudinal blade axis $a$—$a$.

The axis $p$—$p$ of the pitch changing pivot device 19 and the axis $f$—$f$ of the pivot device 16 which provides for individual blade flapping are thus at oblique angles with respect to the longitudinal axis $a$—$a$ of the opposed blades, both of the pivot axes forming acute angles with respect to the leading edge of the blade (the direction of rotation being indicated by the arrow $r$). The major area of the blade thus lies behind the two pivot axes, considered with relation to the direction of rotation, but the obliquities are such that the pivot pins 16 provide mainly for flapping of the blades (in this instance, separate and individual flapping) while the pivot pins 19 provide mainly for pitch variation of the blades (in this instance a common rocking of the blades in equal and opposite motions).

It will be understood that the blades or wings, which are only fragmentarily illustrated, are of a length, in proportion to their chord, several times the length shown on the drawings. They are preferably set, when in true horizontal radial position, at a positive lift incidence of several degrees, within the autorotational range of incidences. When they rock as a unit about the axis $p$—$p$, under the influence of variable aerodynamic forces, the incidence of one blade decreases as the other increases; but at the same time, owing to their ability to normally cone upwardly somewhat on their pivot axis $f$—$f$, and also by virtue of a slight up and down flapping component due to the angularity between the axis $p$—$p$ and the blade axis $a$—$a$, the centrifugal force exerts a substantial stabilizing effect tending to prevent flutter of the assembly of blades about the axis $p$—$p$.

The rotor hub 18 is freely rotatable about the fixed axis member 20, by means of the interposed bearings 21, the member 20 being extended downwardly and with a forward offset whereby it is pivoted on a transverse fulcrum 22 secured in a frame or ring member 23 which latter is fulcrumed at 24 upon a longitudinal axis, by means of pins mounted in the apex member 12. Universal tilting of the rotor axis for control purposes is thus provided for; the longitudinal tilt about the fulcrum 22 being controlled by means of a push and pull rod 25 extending up from the body and pivotally or universally coupled at 26 to the arm or lever 27 which is fixed on the lower end of the non-rotative axis member 20, and the lateral tilt about the fulcrum 24 being controlled by the rod 28 similarly coupled at 29 to a lever or arm 30 which is connected by bracket member 31 to the ring or yoke member 23.

Starting of the rotor prior to take-off is accomplished by a drive from the same engine (not shown) which drives the propeller 32, as by means of a shaft 33 extending up from the body to the top of the pylon where it drives a friction pinion 34 adapted to actuate the friction ring or cone 35 when the rotor is tilted to an extreme forward position. Excessive downward droop of the blades about their flapping pivot pins 16 may be prevented by suitable stops 36 carried by the ring 17.

Due partially to the pitch changing component introduced by the slight obliquity of the flapping axis $f$—$f$ relative to the blade axis $a$—$a$ and due more substantially to the equal and opposite pitch variation effected aerodynamically by rocking of the blades about the axis $p$—$p$, there is material reduction in the necessary range of individual flapping of the blades to effect a given required variation in aerodynamic angle of attack to compensate for the differential pressure on the advancing and retreating blades during forward flight. With such reduction of flapping, the full range of rotor tilting for control purposes can be employed even though the rotor center be located at a less height above the body than is usual, without reducing the operating clearances over the propeller 32 and the tail (not shown). Furthermore, the reduction of flapping reduces the average coning angle of the blades and also the differences in coning of the opposite blades at any given position of their cycle, whereby the excursions of the rotor lift line arising from aerodynamic causes are reduced, as are also the loads and vibrations upon the rotor tilting control system.

Structurally, the arrangement results in a very compact rotor head and makes it possible to locate the planes of the blade pivots and of the rotor axis fulcrum quite close together, as the flapping clearances for the blades need not be as great as heretofore.

Figure 5:
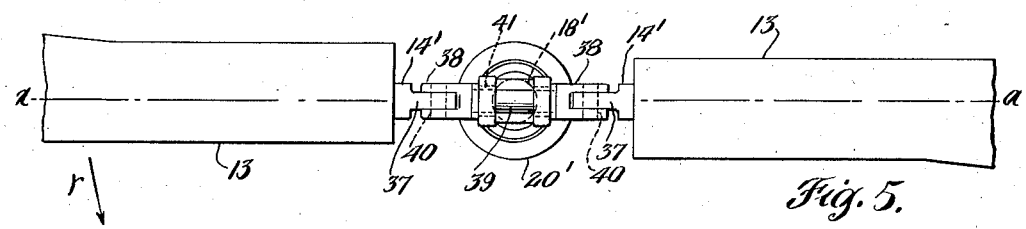
Figure 5 is a top plan view of the mechanism of Figure 4.

Turning now to Figures 4 and 5, it will be seen that in the second embodiment of the invention the blade spars 14' of the blades 13 are each provided with an apertured ear 37 fitting between the fork end 38 of the pivot shaft 39 and articulated thereto by a flapping pivot 40. The shaft 39 is rotatably mounted by bearings 41 at the top of the hub 18' which is rotatable within an external non-rotative axis member or casing 20', the latter being tiltably mounted on a transversely extending fulcrum 22' within a gimbal ring or the like 23', which latter has pivot pins 24' for pivotation thereof about a longitudinal axis in a suitable apex member mounted on a pylon (not shown).

In this embodiment, the axis of the pin 39 coincides with the longitudinal blade axis $a$—$a$, and the axes of the flapping pins 40 are at right angles thereto. Thus the common pivot 39 for the two blades is purely for pitch variation and the pivots 40 are strictly flapping pivots. This arrangement has the advantage of simplicity of construction, and eliminates all appreciable end thrusts and/or irregular shearing stresses on the pivots.

Figure 6:
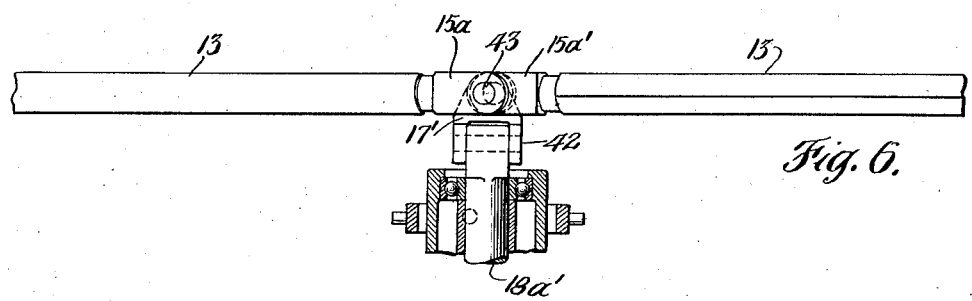
Figure 6 is a view similar to Figures 1 and 4, but illustrating a third embodiment.
Figure 7:
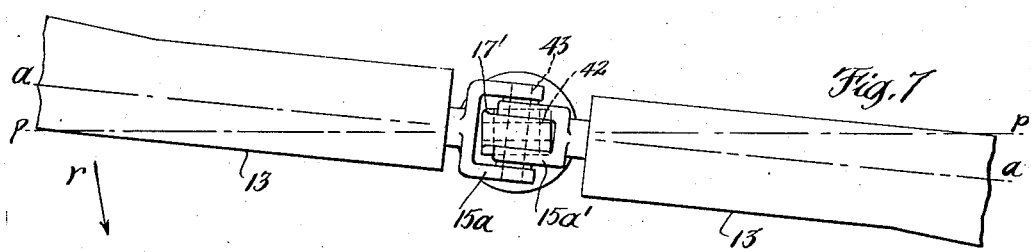
Figure 7 is a top plan view of the structure of Figure 6.

In the third embodiment, illustrated by Figures 6 and 7, the fulcruming of the hub for control purposes is similar to that shown in the second embodiment. The common pivot 42, for the unitary rocking of the blades 13, is in this instance on an axis $p$—$p$ which is at an angle to the blade axis $a$—$a$ (similar to the first embodiment) but is dropped down below the plane of the blade flapping axis, which in this instance is formed by a single pivot pin 43 positioned at right angles to the longitudinal blade axis $a$—$a$ and serving to articulate the blade forks 15a and 15a' upon the rocking member 17' which is in turn mounted by the pin 42 upon the upper end of the rotative hub member 18a'.

By this arrangement the net thrust of the rotor departs very little, at any time, from the position at which it intersects the center of the pivot pin 43, and in this respect involves advantages similar to the first embodiment. At the same time, a stabilizing effect, tending to prevent excessive rocking about the pivot 42 is set up by virtue of the location of the center of lift above the center of the latter pivot.

In any form of the invention, by proper location of the axes $p$—$p$ and $f$—$f$ relative to each other and to the major portion of the blade area it is feasible to obtain a major part of the compensation for differential pressure by the feathering action of the blades and to obtain a minimization of gyroscopic effects, during control movements, primarily by virtue of the flapping pivot means.

I claim:

1. In an aircraft, a sustaining rotor construction comprising a non-rotative support providing an upright axis, a hub rotatably mounted on said support, a tiltable mounting for said support providing for lateral inclination of the axis thereof in any direction, a plurality of autorotative blades or wings radiating from the hub, a wing mounting member to which the wings are individually pivoted for independent oscillation in planes generally transverse the rotative path, and pivot means securing said member on the hub for rocking of the wings as a unit with relation to the hub in a sense to inversely vary their pitch about an axis approximately intersecting the hub axis.

2. In an aircraft, a sustaining rotor construction comprising a non-rotative support providing an upright axis, a hub rotatably mounted on said support, a tiltable mounting for said support providing for lateral inclination of the axis thereof in any direction, a plurality of autorotative blades or wings radiating from the hub, a wing mounting member to which the wings are individually pivoted for independent oscillation, and means mounting said member on the hub for relative movement whereby the wings may rock as a unit with relation to the hub.

3. For an aircraft, a sustaining rotor comprising at least a pair of opposed autorotatably actuable wings, a common axis structure for said wings mounted for normally free rotation in flight, a pivot axis substantially perpendicular to the longitudinal axis of each wing providing for individual up and down flapping of said wings to vary their aerodynamic angle of attack, and means interconnecting said opposed wings and mounted on the axis structure by only a single pivot axis for rocking of said opposed wings as an independent unit substantially about their longitudinal axes to reduce the extent of their flapping action.

4. An aircraft including a body, means of forward propulsion, and a rotor combining sustaining and controlling functions, said rotor including a plurality of autorotatably actuable wings, a common axis structure therefor mounted for normally free rotation in flight, means interconnecting wings of the rotor and pivotally mounted on said axis structure whereby the interconnected wings are rockable as a unit about a single axis, means for individual swinging of one wing substantially independent of another, and means for variably controlling the relation of the lift line of the rotor to the center of gravity of the craft to control the flight of the aircraft.

5. For an aircraft, a sustaining rotor construction including a pair of generally oppositely disposed wings positioned for normal rotation by aerodynamic reaction, a common axis structure for said wings mounted for normally free rotation in flight, and means for mounting said wings on said axis structure comprising pivot means for the wings lying in a plane perpendicular to the axis of rotation and set at an oblique angle with respect to the general longitudinal axes of the wings and other pivot means for the wings having an axis intersecting the common rotational axis.

6. For an aircraft, a sustaining rotor construction including a pair of generally oppositely disposed wings positioned for normal rotation by aerodynamic reaction, a common axis structure for said wings mounted for normally free rotation in flight, and means for mounting said wings on said axis structure comprising pivot means for the wings lying in a plane perpendicular to the axis of rotation and set at an oblique angle with respect to the general longitudinal axes of the wings and other pivot means for the wings having an axis intersecting the common rotational axis and lying in a plane perpendicular to the axis of rotation.

7. For an aircraft, a sustaining rotor construction including a pair of generally oppositely disposed wings positioned for normal rotation by aerodynamic reaction, a common axis structure for said wings mounted for normally free rotation in flight, and means for mounting said wings on said axis structure comprising pivot means for the wings lying in a plane perpendicular to the axis of rotation and set at an oblique angle with respect to the general longitudinal axes of the wings and other pivot means for the wings having an axis intersecting the general longitudinal axes of the wings.

8. For an aircraft, a sustaining rotor comprising an upright axis structure mounted for normally free rotation, a pair of opposed wings positioned for autorotation about said axis structure, pivot means positioned at right angles to the longitudinal axis of the wings providing for free and independent swinging of said wings automatically in response to differential flight forces, and for the pair of wings a sole common pivot coinciding with the longitudinal axes of the wings and mounting said wings on the axis structure for free unitary rocking to effect pitch variation under the influence only of the aerodynamic forces acting on said pair of wings.

9. For an aircraft, a sustaining rotor construction including a pair of generally oppositely disposed wings positioned for normal rotation by aerodynamic reaction, a common axis structure for said wings mounted for normally free rotation in flight, and means for mounting said wings on said axis structure comprising pivot means for the wings lying in a plane perpendicular to the axis of rotation and set at an oblique angle with respect to the general longitudinal axes of the wings and other pivot means for the wings having an axis intersecting the common rotational axis, the first mentioned pivot means providing for individual swinging of each wing substantially independently of the opposite wing.

10. An aircraft having a body, means of forward propulsion, and means of sustention and control comprising a pair of opposed aerodynamically actuable wings, a common axis structure therefor mounted for normally free rotation in flight, a pivotal mechanism for mounting said pair of wings on said axis structure including a member common to both wings and oscillative about an axis intersecting the common rotational axis whereby said wings may rock equally and oppositely as a pair, means of individual pivotation of each wing of a pair on said mechanism, and a substantially transverse pivotal mounting for said axis structure for tilting the same to control the aircraft.

11. In an aircraft having a body and a propulsion airscrew, a tiltable autorotative rotor for sustention and control, means mounting the rotor on the body with relatively slight clearance over the propeller and body elements in addition to the clearance required by the range of control tilt, pivot means providing for individual flapping movements of the rotor blades, and means for minimizing the extent of such flapping including mechanism for automatically varying the rotor blade pitch in response to aerodynamic forces acting in the flapping direction.

12. In an aircraft, a sustaining and controlling rotor comprising an upright axis structure, a plurality of blades radiating therefrom, means articulating the blades to the axis structure for swinging of said blades in paths transverse their general rotative path for automatically compensating differential lift forces, control means coupled to the rotor for effecting an alteration of the general path of rotation of the blades whereby to shift the lift line of the rotor with respect to the center of gravity of the craft, and means for minimizing the said swinging of the blades including mechanism for automatically varying the rotor blade pitch in response to aerodynamic forces acting in the flapping direction.

13. In an aircraft sustaining rotor, a hub, a pair of opposed blades, a common rocking pivot coincident with the longitudinal axes of said blades, and an individual articulation for each blade, the axis of which is oblique to the longitudinal axis of its respective blade.

14. In an autorotative sustaining rotor, an upright non-rotative axis member, a rotative hub mounted thereon, a frame or the like positioned peripherally of the hub and pivotally secured to said hub on an axis intersecting the hub axis, a pair of opposed blades radiating from said hub, and pivot means individually articulating said blades to said frame on a common axis which intersects the axis of the hub.

15. In an autorotative sustaining rotor, an upright non-rotative axis member, a rotative hub mounted thereon, a frame or the like positioned peripherally of the hub and pivotally secured to said hub on an axis intersecting the hub axis, a pair of opposed blades radiating from said hub, and pivot means individually articulating said blades to said frame on a common axis which intersects the axis of the hub and is at an angle to the first mentioned pivot axis.

16. In an aircraft, an autorotatable sustaining and controlling rotor comprising an upright hub and a pair of opposed blades, a tiltable mounting for the hub providing for movements of the rotor for control purposes, a pivot device for said pair of blades the axis of which extends generally lengthwise of the blades whereby differential lift forces are compensated by inverse variation of the pitch of said blades, and pivot means for said blades extending generally parallel to the chord of the blades whereby to provide swinging of the blades transverse their rotative path to minimize gyroscopic effects upon rotor control movement.

KENNETH P. SYNNESTVEDT.